(12) United States Patent
Neely et al.

(10) Patent No.: US 11,161,444 B2
(45) Date of Patent: Nov. 2, 2021

(54) HEATED FLOOR MAT ASSEMBLY

(71) Applicant: DEERE & COMPANY, Moline, IL (US)

(72) Inventors: Jesse R. Neely, Annawan, IL (US); Steven M. Wardlow, Sherrard, IL (US); Chad A. Dow, Coal Valley, IL (US); Andrew M. Pietsch, Davenport, IA (US)

(73) Assignee: Deere & Company, Moline, IL (US)

( * ) Notice: Subject to any disclaimer, the term of this patent is extended or adjusted under 35 U.S.C. 154(b) by 147 days.

(21) Appl. No.: 16/561,581

(22) Filed: Sep. 5, 2019

(65) Prior Publication Data
US 2021/0070207 A1    Mar. 11, 2021

(51) Int. Cl.
| | | |
|---|---|---|
| *B60N 3/04* | (2006.01) | |
| *H05B 3/00* | (2006.01) | |
| *B32B 25/04* | (2006.01) | |
| *A47G 27/02* | (2006.01) | |

(52) U.S. Cl.
CPC ............ *B60N 3/048* (2013.01); *B32B 25/042* (2013.01); *B32B 25/045* (2013.01); *H05B 3/0019* (2013.01); *A47G 27/0206* (2013.01); *B32B 2405/00* (2013.01)

(58) Field of Classification Search
None
See application file for complete search history.

(56) References Cited

U.S. PATENT DOCUMENTS

| | | | |
|---|---|---|---|
| 4,661,689 A | 4/1987 | Harrison | |
| 6,770,848 B2 | 8/2004 | Haas et al. | |
| 2005/0158503 A1 | 7/2005 | O'Connor | |
| 2007/0034622 A1 | 2/2007 | Ruminski | |
| 2015/0375657 A1* | 12/2015 | Braun ................. | B60N 2/5685 219/202 |
| 2020/0323301 A1* | 10/2020 | Yamaoka ............. | B60N 2/5685 |

FOREIGN PATENT DOCUMENTS

| | | | |
|---|---|---|---|
| DE | 19714018 A1 | 10/1998 | |
| DE | 112017001475 T5 * | 12/2018 | ............... H05B 6/44 |
| GB | 1165701 A | 10/1969 | |
| JP | H11159780 A | 6/1999 | |

\* cited by examiner

*Primary Examiner* — Alexander S Thomas

(57) ABSTRACT

A floor mat assembly for use on a floor comprises a floor mat, a first adhesive layer, a heating element, a second adhesive layer, and an insulative foam support layer. The floor mat comprises a topside for interaction with a person. The heating element is bonded to an underside of the floor mat with the first adhesive layer to heat the floor mat. The foam support layer is bonded to an underside of the heating element with the second adhesive layer.

10 Claims, 5 Drawing Sheets

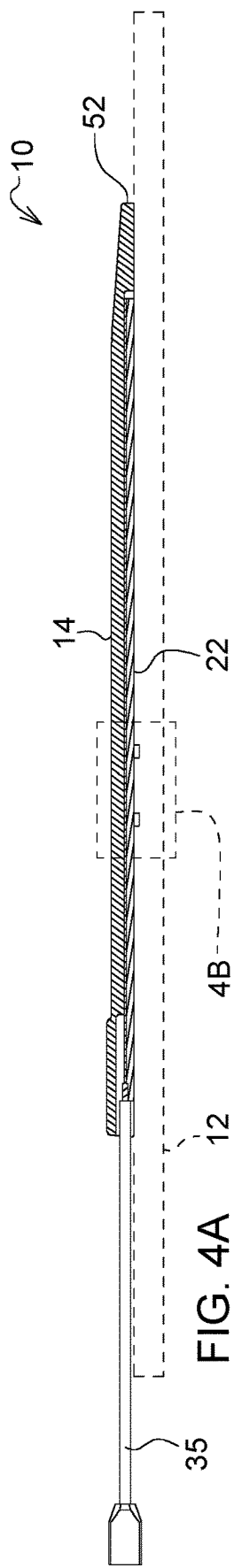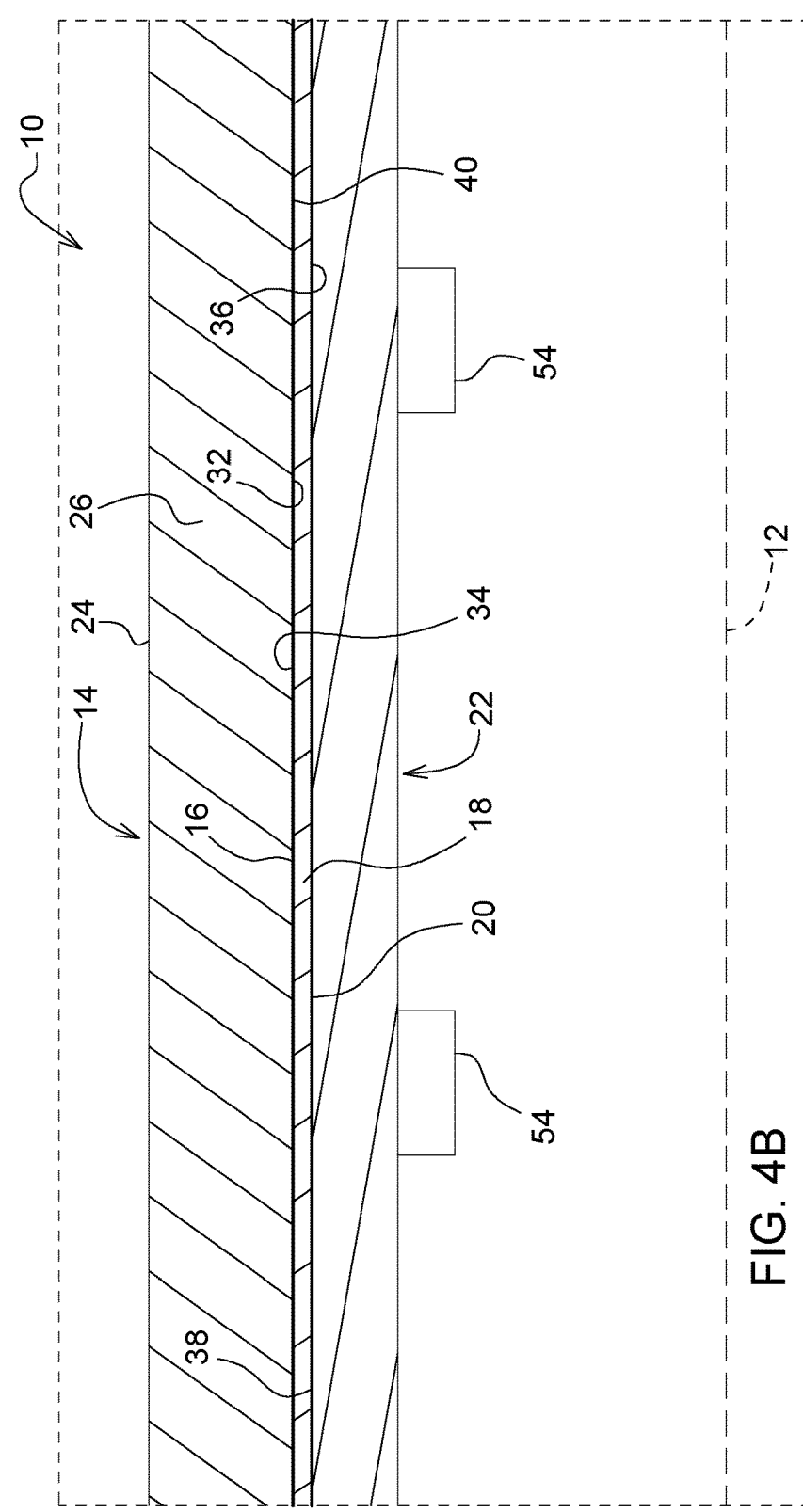

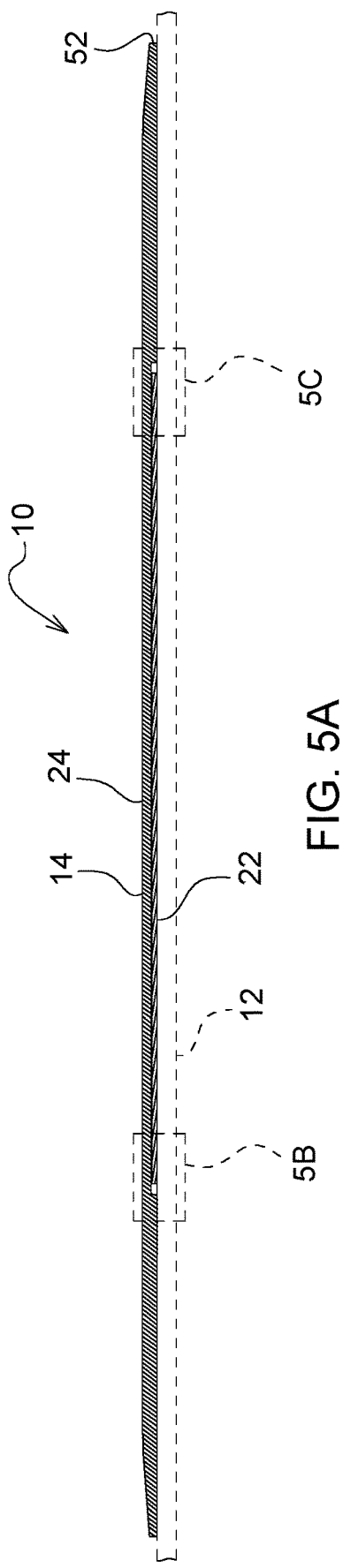
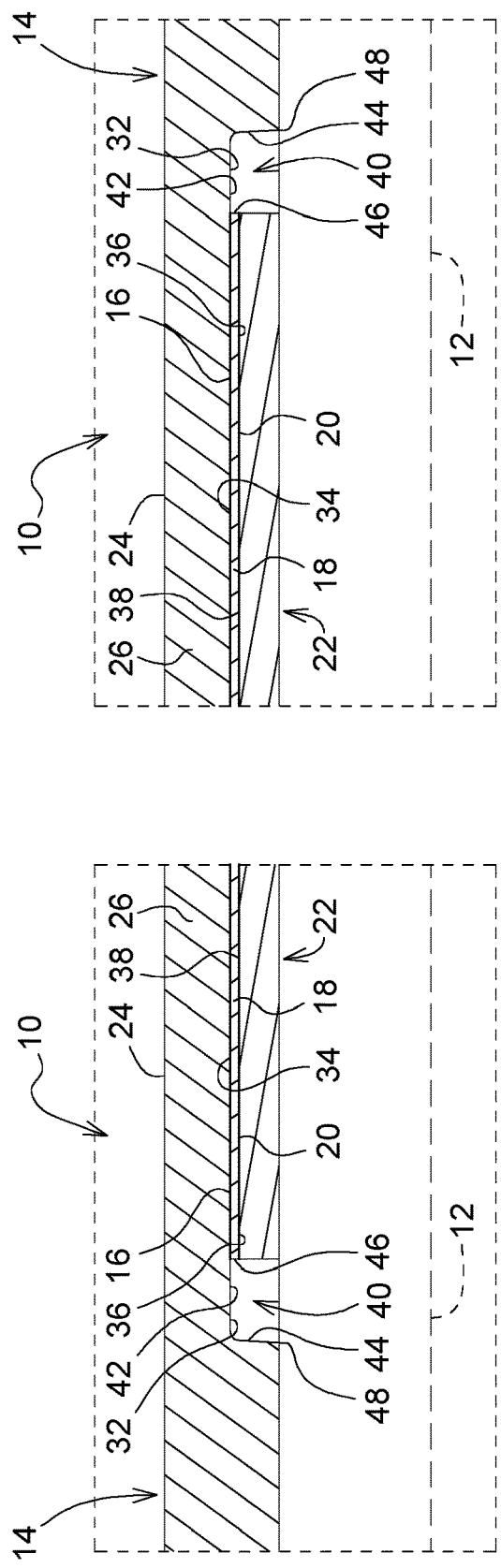
FIG. 5A
FIG. 5B
FIG. 5C

HEATED FLOOR MAT ASSEMBLY

FIELD OF THE DISCLOSURE

The present disclosure relates to a floor mat assembly.

BACKGROUND OF THE DISCLOSURE

In some vehicle configurations, the floor on which operators place their feet may become cooler than operators would prefer. The operators may complain that their feet and lower legs get cold when operating the vehicle in colder climates.

SUMMARY OF THE DISCLOSURE

According to an aspect of the present disclosure, there is disclosed a heated floor mat assembly for use on a floor. The floor mat assembly comprises a topside for interaction with a person, a first adhesive layer, a heating element bonded to an underside of the floor mat with the first adhesive layer to heat the floor mat, a second adhesive layer, and an insulative foam support layer bonded to an underside of the heating element with the second adhesive layer. The underside of the floor mat comprises a recess. The heating element, the first and second adhesive layers, and the foam support layer are positioned in the recess. The recess opens downwardly to expose the foam support layer to a floor to support the floor mat assembly on the floor.

The above and other features will become apparent from the following description and accompanying drawings.

BRIEF DESCRIPTION OF THE DRAWINGS

The detailed description of the drawings refers to the accompanying figures in which:

FIG. 4A is a sectional view, taken along lines 4A-4A of FIG. 1;

FIG. 4B is an enlarged view of region 4B of FIG. 4A;

FIG. 5A is a sectional view, taken along lines 5A-5A of FIG. 1;

FIG. 5B is an enlarged view of region 5B of FIG. 5A; and

FIG. 5C is an enlarged view of region 5C of FIG. 5A.

DETAILED DESCRIPTION OF THE DRAWINGS

Figure 1:
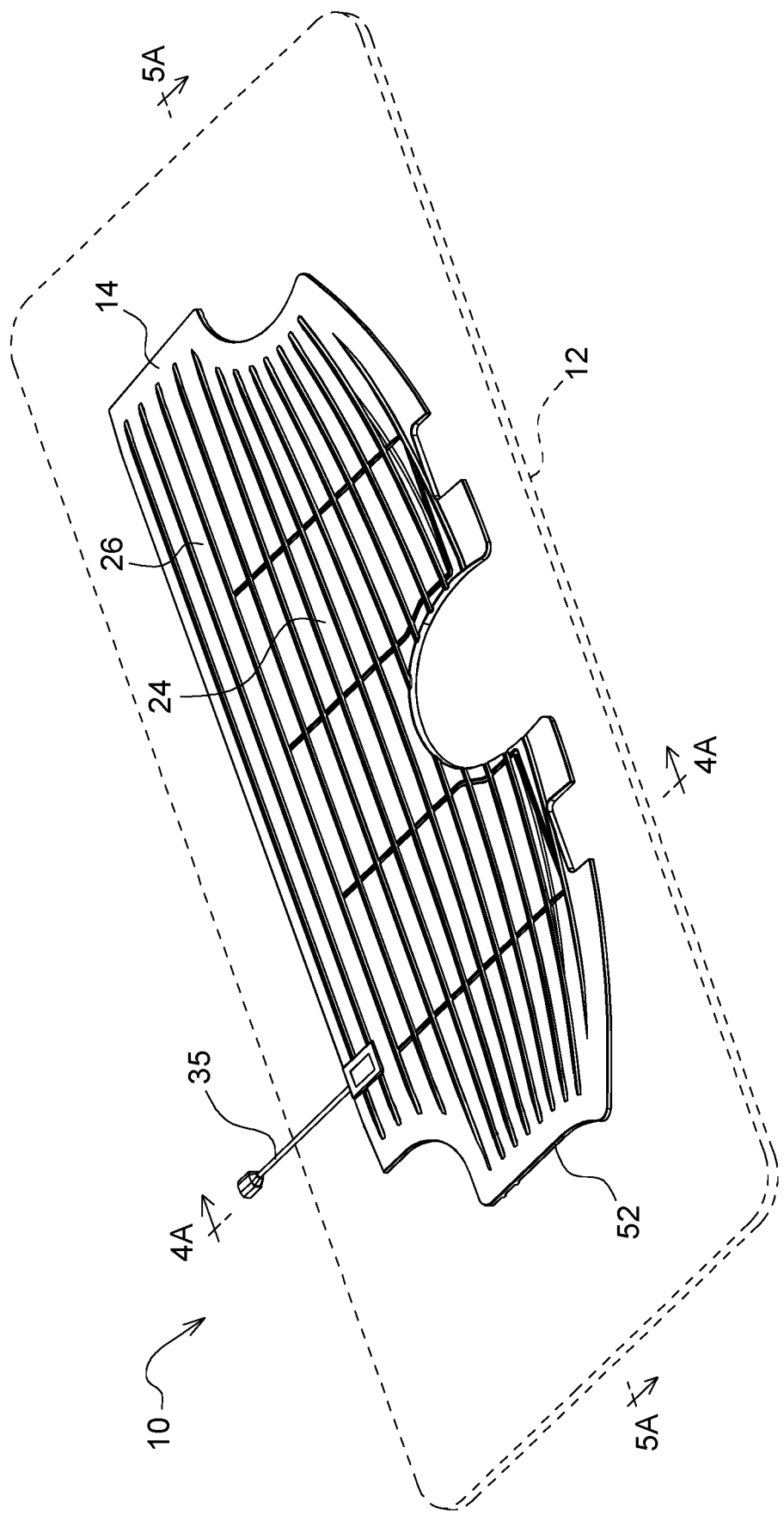
FIG. 1 is a top perspective view showing a floor mat assembly on a floor.
Figure 2:
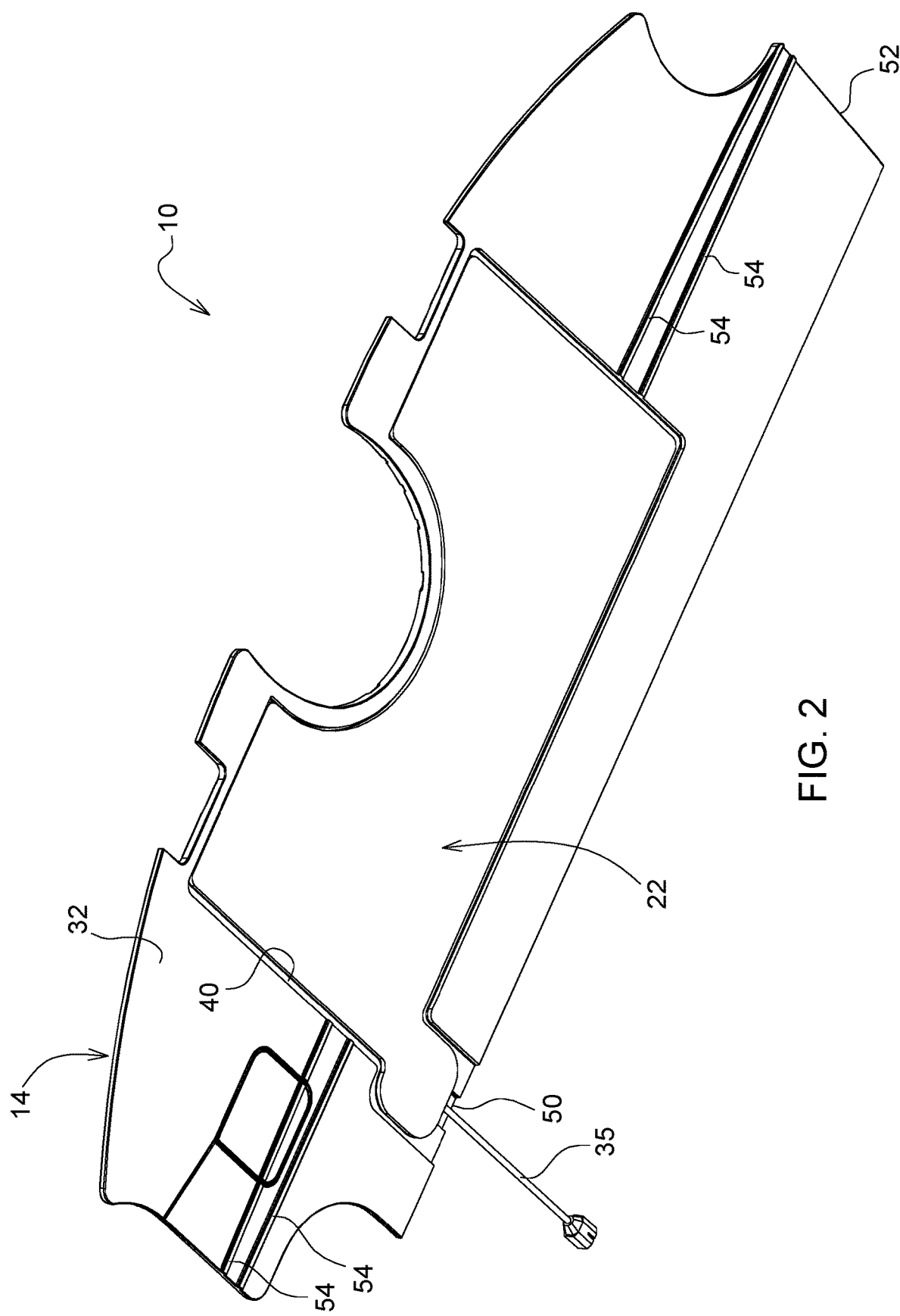
FIG. 2 is a bottom perspective view showing the floor mat assembly.
Figure 3:
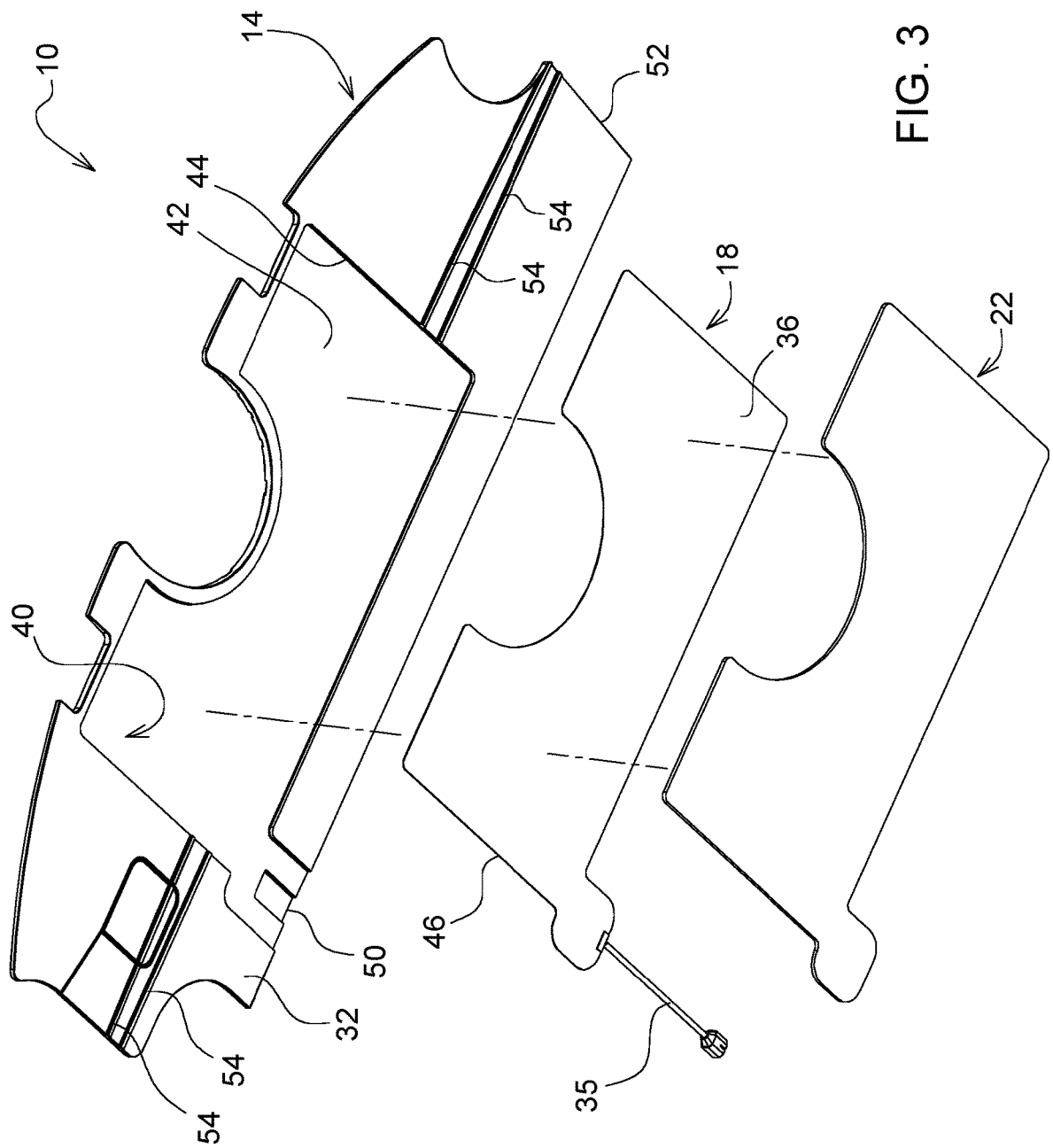
FIG. 3 is an explode perspective view showing the floor mat assembly.

Referring to FIGS. 1 and 2, a floor mat assembly 10 is disclosed for use with a floor 12 (shown diagrammatically). The floor mat assembly 10 is placed on the floor 12 and is heated to warm the feet of a person whose feet are on the floor mat assembly 10. The floor 12 may be the floor of an operator's station of a work vehicle such as, for example, an agricultural machine (combine, windrower, self-propelled forage harvester, etc.), a construction vehicle, or a forestry vehicle, to name but a few possible environments where the floor mat assembly 10 could be used. One of ordinary skill in the art will recognize that the floor mat assembly 10 could be used in a wide variety of other contexts.

Referring to FIGS. 3-5C, the floor mat assembly 10 includes a floor mat 14, a first adhesive layer 16, a heating element 18, a second adhesive layer 20, and an insulative foam support layer 22. The floor mat 14 includes a topside 24 for interaction with a person. The person may stand on the topside of the floor mat 14, or otherwise put their feet on the topside 24. A top wall 26 of the floor mat 14 includes the topside 24, and has a thickness of, for example, about 7.5 millimeters from a top surface of the topside 24 of the floor mat 14 to an upper portion 42 of a main region of a recess 40 of the floor mat 14. The floor mat 14 may be made, for example, of rubber (e.g., styrene butadiene rubber) (the floor mat 14 represented with generic hatching in the sectional views of FIGS. 4A-5C).

The heating element 18 is bonded to an underside 32 of the floor mat 14 with the first adhesive layer 16 to heat the floor mat 14 and a person's feet which may be on the topside 24 of the floor mat 14 for comfort of the person. The first adhesive layer 16 is positioned between and in contact with the floor mat 14 and the heating element 18. The first adhesive layer 16 contacts the underside 32 of the floor mat 14 and a topside 34 of the heating element 18. The first adhesive layer 16 may be made of, for example, a pressure-sensitive adhesive and has a thickness of, for example, about 80 microns. The first adhesive layer 16 is represented as a thickened line for the sake of illustration and not intended to be drawn to scale.

The heating element 18 may be configured, for example, as a printed circuit heating element. In such a case, the heating element 18 may include an upper laminate (e.g., about 0.05 millimeter thick), a lower laminate (e.g., about 0.075 millimeter thick), and an electrical circuit (e.g., about 0.02 millimeter thick) sandwiched between and in contact with the upper and lower laminates (the heating element 18 represented as a single unit with generic hatching in the sectional views of FIGS. 4A-5C for ease of illustration). Each of the upper and lower laminates may be configured as a plastic sheet made of, for example, polyester. The upper laminate includes the topside 34 of the heating element 18. The lower laminate includes an underside 36 of the heating element 18. The electrical circuit includes, for example, conductive trace(s) that provide resistive heating when electrical power is applied. The conductive trace(s) may be made, for example, of copper. The trace pattern may be configured in any pattern suitable for the application.

A power cord 35 is coupled electrically to the heating element 18 to supply electrical power thereto. The power cord 35 can connect to a suitable electrical power source (e.g., an auxiliary plug at the operator's station).

The foam support layer 22 is bonded to the underside 36 of the heating element 18 with the second adhesive layer 20. The foam support layer 22 supports the floor mat assembly 10 on the floor 12. The foam support layer 22 supports the floor mat 14 and the heating element 18 such that the heating element 18 is sandwiched between the floor mat 14 and the foam support layer 22 without being embedded in the floor mat 14 or the foam support layer 22. The foam support layer 22 is configured, for example, as a panel. The foam support layer 22 may be made of, for example, a closed-cell foam and has a thickness of, for example, 5 millimeters (the foam support layer 22 represented with generic hatching in the sectional views of FIGS. 4A-5C).

The second adhesive layer 20 is positioned between and in contact with the heating element 18 and the foam support layer 22. The second adhesive layer 20 contacts the underside 36 of the heating element 18 and a topside 38 of the foam support layer 22. The second adhesive layer 20 may be made of, for example, a pressure-sensitive adhesive and has a thickness of, for example, about 80 microns. The second adhesive layer 20 is represented as a thickened line for the sake of illustration and not intended to be drawn to scale.

The underside 32 of the floor mat 14 includes the recess 40. The heating element 18, the first and second adhesive layers 16, 20, and the foam support layer 22 are positioned in the recess 40. The recess 40 opens and faces downwardly to expose the foam support layer 22 to the floor 12 to support the floor mat assembly 10 on the floor 12.

The recess 40 includes a upper portion 42 and a periphery 44 extending downwardly from the upper portion 42. The periphery 44 surrounds most of a periphery 46 of the heating element 18, the first and second adhesive layers 16, 20, and the foam support layer 22. The periphery 44 defines a downwardly-facing recess opening 48 of the recess 40 through which the foam support layer 22 contacts the floor 12. The periphery 44 has a cord opening 50 through which the power cord 35 extends from the recess 40 to the exterior of the floor mat 14 and the floor mat assembly 10.

A rim 52 of the floor mat 14 mostly surrounds the recess 40 and its periphery 44. The cord opening 50 opens through the rim 52.

The floor mat assembly 10 may include interlocks 54. Each interlock 54 is configured to interface with the floor 12 to inhibit movement of the floor mat assembly 10 relative to the floor 12. Each interlock 54 is configured, for example, as a rib on the bottom of the floor mat 14, each rib received in a corresponding groove (not shown) of the floor 12.

The floor mat assembly 10 is illustrated as an auxiliary floor mat assembly for use on the floor 12, which is itself a type of floor mat positioned on an underlying floor. In other embodiments, the floor mat assembly 10 could be integrated into the floor 12 and could be thermostatically controlled.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A floor mat assembly for use on a floor, comprising:
   a floor mat comprising a topside for interaction with a person,
   a first adhesive layer,
   a heating element bonded to an underside of the floor mat with the first adhesive layer to heat the floor mat,
   a second adhesive layer, and
   an insulative foam support layer bonded to an underside of the heating element with the second adhesive layer, the underside of the floor mat comprising a recess, wherein the heating element, the first and second adhesive layers, and the foam support layer are positioned in the recess which opens downwardly to expose the foam support layer to the floor to support the floor mat assembly on the floor.

2. The floor mat assembly of claim 1, wherein the recess comprises a periphery surrounding most of a periphery of the heating element, the first and second adhesive layers, and the foam support layer.

3. The floor mat assembly of claim 2, comprising a power cord coupled electrically to the heating element, wherein the periphery of the recess comprises a cord opening through which the power cord extends.

4. The floor mat assembly of claim 1, wherein the heating element is sandwiched between the floor mat and the foam support layer without being embedded in the floor mat.

5. The floor mat assembly of claim 1, wherein the floor mat is made of rubber.

6. The floor mat assembly of claim 1, wherein the heating element is a printed circuit heating element.

7. The floor mat assembly of claim 1, wherein the foam support layer is made of closed-cell foam.

8. The floor mat assembly of claim 1, wherein each of the first and second adhesive layers is made of a pressure-sensitive adhesive.

9. The floor mat assembly of claim 1, comprising an interlock configured to interface with the floor to inhibit movement of the floor mat assembly relative to the floor.

10. The floor mat assembly of claim 9, wherein the interlock includes a rib on the bottom of the floor mat.

* * * * *